United States Patent [19]

De Block et al.

[11] Patent Number: 4,999,121

[45] Date of Patent: Mar. 12, 1991

[54] METHOD FOR PREPARING TEXTILE TREATMENT COMPOSITIONS: ADDING MOLTEN SOFTENING AGENT TO AQUEOUS ACID SOLUTION

[75] Inventors: Franciscus De Block, Merchtem; Maurizio Marchesini, Brussels; Raphaël Ceulemans, Kessel-Lo, all of Belgium

[73] Assignee: The Procter & Gamble Company, Cincinnati, Ohio

[21] Appl. No.: 271,568

[22] Filed: Nov. 15, 1988

[30] Foreign Application Priority Data

Nov. 18, 1987 [GB] United Kingdom ................. 8727038
Jul. 5, 1988 [GB] United Kingdom ................. 8815974

[51] Int. Cl.[5] ......................... C11D 1/40; C11D 3/30; C09K 3/16; D06M 13/34

[52] U.S. Cl. .................................... 252/8.8; 252/8.75; 252/8.9

[58] Field of Search ......................................... 252/8.8

[56] References Cited

U.S. PATENT DOCUMENTS 3,681,241 8/1972 Rudy .................................... 252/8.8
4,060,505 11/1977 Ciko et al. ............................ 252/8.8
4,127,489 11/1978 Pracht et al. ......................... 252/8.8
4,155,855 5/1979 Goffinet et al. ..................... 252/8.8
4,401,578 8/1983 Verbruggen .......................... 252/8.8
4,426,299 1/1984 Verbruggen .......................... 252/8.8
4,454,049 6/1984 MacGilp et al. ...................... 252/8.8
4,724,089 2/1988 Konig et al. ......................... 252/8.8

FOREIGN PATENT DOCUMENTS 18039 10/1980 European Pat. Off. .

*Primary Examiner*—A. Lionel Clingman
*Attorney, Agent, or Firm*—Robert B. Aylor; Richard C. Witte

[57] ABSTRACT

The invention relates to the preparation of textile treatment compositions containing certain cyclic amine softeners.

In particular, a process for preparing a concentrated composition containing said cyclic amine softeners is encompassed, as well as a process for preparing textile treatment compositions from the above concentrate preferably by adding said concentrate to a dispersion of quaternary softening agent.

Textile treatment compositions resulting from the above process are also claimed.

23 Claims, 1 Drawing Sheet

METHOD FOR PREPARING TEXTILE TREATMENT COMPOSITIONS: ADDING MOLTEN SOFTENING AGENT TO AQUEOUS ACID SOLUTION

TECHNICAL FIELD

The present invention relates to a method for the preparation of concentrated compositions containing certain cyclic amine softeners, and of textile treatment compositions derived therefrom.

BACKGROUND OF THE INVENTION

Textile treatment compositions suitable for providing fabric softening and static control benefits to laundered fabrics are well-known in the art and have found wide-scale commercial application. Conventionally, rinse-added fabric softening compositions contain, as the active softening component, substantially water-insoluble cationic materials having two long alkyl chains. Typical of such materials are di-stearyl di-methyl ammonium chloride and imidazolinium compounds substituted with two stearyl groups.

Recently, a new class of softening agents has been developed, which possess improved softening abilities. Such compounds, disclosed in EPA 0 199 383, are selected from di-higher alkyl cyclic amines, with the di-tallow imidazolines and ester derivatives thereof being preferred.

Retail fabric softening compositions are typically prepared by dispersion in warm water of a slurry containing the softener material. Making can advantageously be done in a two-step operation, wherein an aqueous dispersion of the softener material is first prepared, and later on further dispersed in water to form the final composition at the desired concentration. The manufacturer has all the reasons to prefer that the first dispersion containing the softener material be as concentrated as possible, in particular obvious economic reasons when the pre-mix has to be shipped before being dispersed in water to form final product, while obviously keeping a pourable and pumpable product for use in further process steps.

However for the new softening materials as well as for the conventional cationic agents mentioned hereinabove, it has proven almost impossible to prepare concentrates containing more than 10% of softening material without encountering intractable problems of product viscosity and stability.

Various solutions have been suggested in the prior art to overcome this problem; illustrations thereof are EPA 406, relating to the incorporation of certain nonionic adjunct softening materials to prepare concentrated dispersions of softener material;

EPA 0,018,039, which relates to hydrocarbons plus soluble cationic or nonionic surfactants in softener concentrates to improve viscosity and stability characteristics;

U.S. Pat. Nos. 4,426,299, and 4,401,578 relating to paraffin, fatty acids and ester estenders for softener concentrates.

However, the various solutions proposed as of yet have not been entirely satisfactory.

It is also generally known for example, in U.S. Pat. No. 3,681,241, that the presence of ionizable salts in softener compositions does help reduce viscosity, but this approach is ineffective in compositions containing more than about 12% of dispersed softener, in as much as the level of ionizable salts necessary to reduce viscosity to any substantial degree has a seriously detrimental effect on product stability.

In addition to the problems related to high concentrations, a further difficulty has appeared in the preparation of softening compositions containing the specific cyclic amines mentioned hereinabove, due to the unstable nature of the materials, the imidazoline ring for example being subject to hydrolysis.

It has appeared that stringent conditions need to be applied if one wants to obtain a stable, concentrated dispersion containing said softening agents in the molten state; such conditions include high temperature, inert atmosphere, absence of moisture, and are therefore difficult and expensive to create, especially upon shipment of the concentrated dispersion.

It has been found that stability problems become even more acute when the said new softening agents are mixed with a quaternary softening agent before being dispersed in water to form the final composition.

There is, therefore, a need for concentrated compositions containing certain cyclic amines softening agents, which show satisfactory viscosity and stability characteristics, especially in the case when the cyclic amine softeners are to be mixed with quaternary softening agents, without requiring stringent conditions, and without requiring the presence of a ionizable salt as electrolyte.

The present invention answers the above need and solves the standing problems of the state of the art.

It is an object of the present invention to provide a process for making stable pourable, pumpable concentrated compositions containing certain cyclic amines softening agents, without needing the adjunction of a ionizable salt as electrolyte.

It is a further object of the present invention to provide a process for making fabric softening compositions containing a cyclic amine softening agent, preferably in combination with a quaternary softening agent.

It is a further object of the present invention to provide concentrated compositions, and fabric softening compositions derivable therefrom, which are made according to the process of the invention.

SUMMARY OF THE INVENTION

Figure 1:
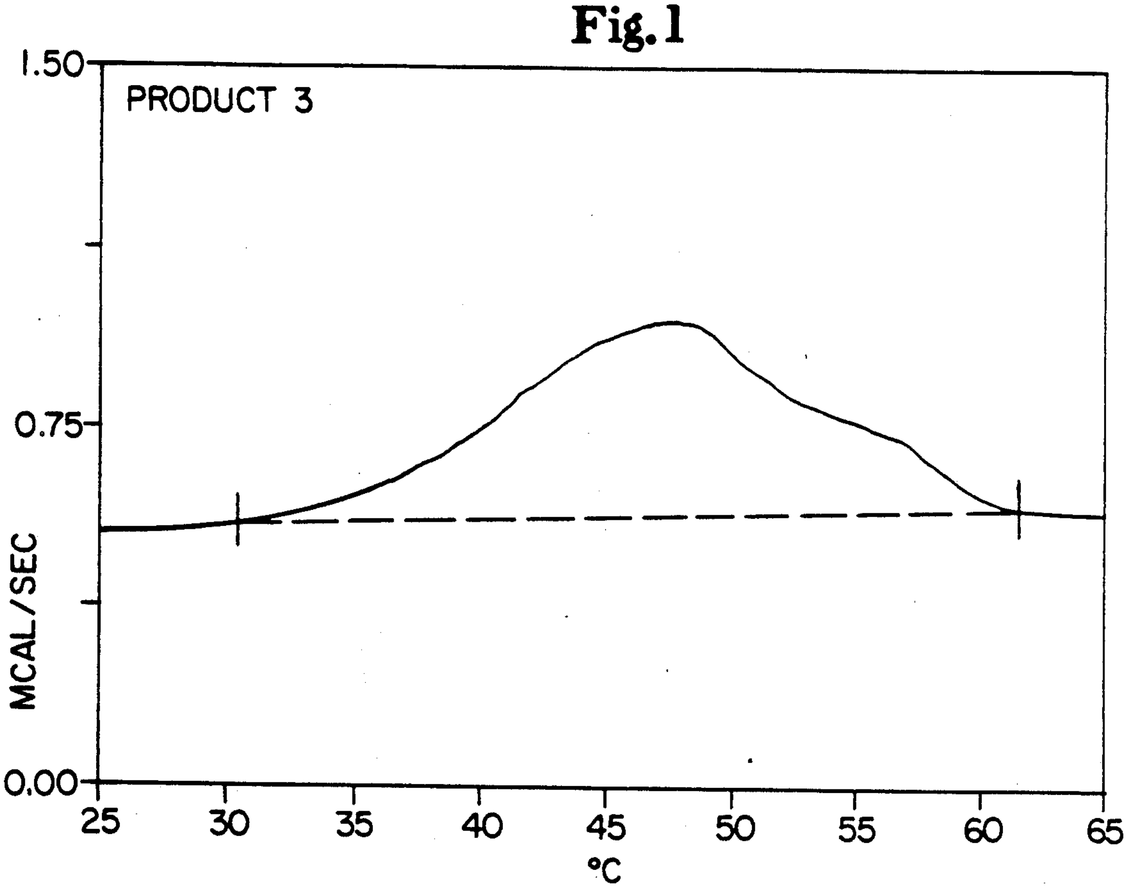
FIGS. 1 and 2 are Differential Scanning Calorimetry (DSC) test results for Products 3 and 2, respectively.

The present invention relates to the preparation of textile treatment compositions containing a softening agent of the formula:

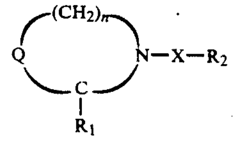

(I)

wherein n is 2 or 3, preferably 2; $R_1$ and $R_2$ are, independently, a $C_8$–$C_{30}$ alkyl or alkenyl, preferably $C_{12}$–$C_{20}$ alkyl, more preferably $C_{15}$–$C_{18}$ alkyl, or mixtures of such alkyl radicals. Examples of such mixtures are the alkyl radicals obtained from coconut oil, "soft" (non-hardened) tallow, and hardened tallow. Q is CH or N, preferably N X is $-R_4-T-\underset{\underset{O}{\|}}{C}-$ wherein T is O or $NR_5$, $R_5$ being H or $C_1$–$C_4$ alkyl, preferably H, and $R_4$ is a divalent $C_1$–$C_3$ alkylene group or $(C_2H_4O)_m$, wherein m is a number of from 1 to 8; or X is $R_4$.

The invention encompasses, in particular, a process for preparing a concentrated composition containing from 10% to 40% by weight of the softening agent of formula I, said process comprising the steps of:

(a) adding a Bronstedt acid or an aqueous solution thereof to water at a temperature of from 50° C. to 100° C., the quantity of said Bronstedt acid not exceeding 90% of the total quantity of Bronstedt acid to be used in steps (a) and (c), said total quantity of Bronstedt acid being from 1% to 50% of the softening agent of formula I.

(b) Injecting in the solution of step (a), a melt at a temperature higher than 75° C. containing the softening agent of formula I.

(c) Concurrently with step (b), gradually injecting in the solution of step (a), the remaining quantity of Bronstedt acid.

(d) Adding a compound selected from the group of polyols, mono and poly-hydroxy acids and salts thereof, ethoxylated amines and mixtures thereof, and amino-acids in an amount of from 3% to 30% of the softening agent of formula I.

(e) Adding a water-insoluble perfume composition, the quantity of said perfume composition being from 2% to 15% of the softening agent of formula I.

The present invention also encompasses a process for preparing textile treatment compositions derived from the above concentrate, preferably by adding said concentrate to a dispersion of a quaternary ammonium softening agent or imidazolimium softener.

Finally, compositions resulting from the preferred two-stage process above are aimed, at which are characterized by the presence of two different softening ingredients as two distinct dispersions.

DETAILED DESCRIPTION OF THE INVENTION

A. Preparation of a concentrated composition containing a cyclic amine softening agent The present process is characterized by a succession of specific steps which allow the preparation of concentrated compositionss containing from 10% to 40% of the softening agent of formula I which are pourable and pumpable, i.e. do not have the gelling problems usually encountered with concentrated compositions containing softening agents; the viscosity is in the range of from 20 cp to 500 cp; the obtained compositions show also very good stability characteristics on storage.

Step (a) consists in preparing a solution of a Bronstedt acid in water, at a temperature of from 50° C. to 100° C.

Bronstedt acids having a pKa value of 6 or less have been found to be excellent dispersing acids for the cyclic amines of teh compositions herein. The total amount of acid is from 1% to 50% by weight of the cyclic amine of formula I, preferably from 2% to 30%, most preferably from 3 to 15%.

Examples of suitable Bronstedt acids include the inorganic mineral acids carboxylic acids, in particular the low molecular weight ($C_1$–$C_5$) carboxylic acids, and alkylsulfonic acids.

Suitable inorganic acids include HCL, HBr, $H_2SO_4$, $H_2SO_3$, $HNO_3$ and $H_3PO_4$. Suitable organic acids include formic, acetic, methylsulfonic and ethylsulfonic acid. Preferred acids are phosphoric, formic acid, methylsulfonic acid, hydrochloric acid.

Depending on its nature, the acid will be added as an appropriate aqueous solution. Certain acids, such as formic acid, could even be added as is. Hydrochloric acid will be added as a 5 to 37% aqueous solution, preferably 12 to 18%.

One of the particularties of the process herein is that the Bronstedt acid is not added all at one time, but only a quantity not exceeding 90%, preferably 10% to 70% of the total quantity of Bronstedt acid needed, is first used.

Step (b) consists in the injection in the solution derived from step (a), of a melt containing a cyclic amine softening agent.

Such softening agents have the following formula:

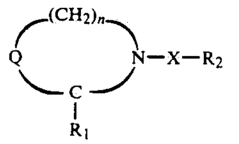

Formula I wherein n is 2 or 3, preferably 2; $R_1$ and $R_2$ are, independently, a $C_8$–$C_{30}$ alkyl or alkenyl, preferably $C_{12}$–$C_{20}$ alkyl, more preferably $C_{15}$–$C_{18}$ alkyl, or mixtures of such alkyl radicals. Examples of such mixtures are the alkyl radicals obtained from coconut oil, "soft" (non-hardened) tallow, and hardened tallow. Q is CH or N, preferably N.

X is $-R_4-T-\underset{\underset{O}{\|}}{C}-$ wherein T is O or $NR_5$, $R_5$ being H or $C_1$–$C_4$ alkyl, preferably H, and $R_4$ is a divalent $C_1$–$C_3$ alkylene group or $(C_2H_4O)_m$, wherein m is a number of from 1 to 8; or X is $R_4$.

Most preferred softening agents of the formula I are imidazolines of the following formulae:

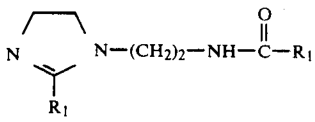

Ia and

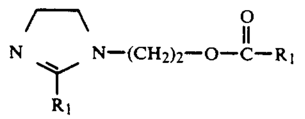

Ib wherein $R_1$ is a tallow group.

Especially preferred are compounds of formula Ia, called ditallowimidazolines.

The melt injected in the present step preferably consists solely of a cyclic amine of formula I; Alternatively, the melt may consist of a mixture of a cyclic amine of formula I and of a quaternary softening agent such as described hereinafter.

The melt is injected slowly to the solution of step (a), at a temperature higher than 75° C., preferably from 75° C. to 95° C.; under vigorous stirring.

Another particularity of the present process is that, during this step, the mixing speed is higher than in similar state-of-the-art processes involving solely conventional quaternary softening agents.

The tip speed is typically set up to about 6 m/s to 7 m/sec, but even higher speeds are possible. Such a high agitation speed allows the formulation of a product with smaller particles size as compared to products obtained by the agitation speed currently used, i.e. up to 3.5 m/s.

High tip speeds have been avoided in state-of-the-art compositions since it was known to lead to an uncceptable product viscosity.

With the present process on the contrary, it is possible to use high tip speed while keeping good product viscosity characteristics. The known benefits of small particle size can therefore be obtained with the compositions derived from the present process.

Step (c) the remaining quantity of Bronstedt acid is injected to the solution of step (a) concurrently with the cyclic-amine softening agent. It is important that the acid be added gradually to the solution, and at about the same speed as of the amine softening agent. The pH of the dispersion, after mixing, should not be greater than 5, preferably not greater than 4.

Step (d) During, or upon completion of, the addition of the softening agent and the acid, a compound selected from the group of polyols, mono- and polyhydroxy acids and salts thereof, ethoxylated amines and mixtures thereof, and amino-acids is added to the solution, preferably by injection.

Polyols within the meaning herein, include polyalcohols such as polyethylene glycol, polypropylene glycol, mannitol, sorbitol, and include also poly-hydroxy compounds such as mono and polysaccharides, e.g. glucose.

Mono- and poly-hydroxy acids within the meaning herein include gluconic acid, citric acid, tartaric acid, malic acid, lactic acid, salycilic acid. Salts of said acids are represented by alkali metal salts, such as sodium and potassium salts; the mono and poly-hydroxy acids herein are preferably used in combination with an alkali-metal salt thereof, to mitigate pH variation which would result from the use of the acid from alone.

Among ethoxylated amines, highly preferred are amines with a limited number of ethoxy group, and especially suitable are mono-, di-, and triethanolamine. Among amino-acids, preferred is lysine.

Polyethylene glycol, gluconic/sodium gluconate, citric acid/sodium citrate are the preferred species and are added preferably in the form of an aqueous solution. The polyethylene glycol useful herein should have a molecular weight from 2000 to 1000 preferably from 400 to 8000, a molecular weight of about 6000 being especially preferred.

The amount of polyol ethoxylated amine or acid/salt combination is from 3% to 30%; preferably from 5% to 20%, most preferably about 10% of the softening agent of formula I.

Step (e) Concurrently with step (c) or after step (d), a water-insoluble perfume composition is added to the dispersion. The amount of perfume composition is from 2% to 15%, preferably from 3% to 8% of the cyclic-amine softening agent of formula I.

At this stage, a stable and pourable composition is obtained, which contains a high concentration of amine softening agent of formula I;

It must be noted that, since the viscosity characteristics of the composition herein are excellent, there is no need to add water soluble ionizable salts such as calcium chloride as electrolytes.

These materials have been used in state-of-the-art compositions to reduce viscosity but have been found to give a detrimental effect on product stability.

The concentrates obtained hereinabove exhibit per-sé very good textile softening abilities, therefore they can be used directly as softening compositions.

It is however a preferred embodiment herein that such concentrates be further processed to form final retail products.

B. Preparation of textile treatment products from the concentrated compositions obtained hereinabove Such a preparation may simply consist in the dilution of the concentrate of A in deionized water, and the adjunction of various ingredients in minor quantities necessary for the final appearance of the product.

If the melt used in step (b) hereinabove contained a quaternary softening agent in addition to the cyclic-amine of formula I, the concentrate of A and therefore the final product of B will contain a mixture of two different softening actives. However, a dual active softening composition is more preferably prepared by the alternative hereinafter described.

Indeed, it is a preferred embodiment of the present invention that the concentrated composition obtained in A be added to an aqueous dispersion of a quaternary softening agent;

It is therefore possible to prepare fabric-softening compositions containing a mixture of the softening agents of formula (I) and of quaternary softening agents while avoiding the unstability problems which are encountered when the two types of softening agents are directly pre-mixed together without using the specific steps (a) to (d) hereinabove.

The quaternary softening agents useful herein are selected from the group of (i) acyclic quaternary ammonium salts having the formula:

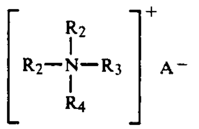

wherein $R_2$ is an acyclic aliphatic $C_{15}$–$C_{22}$ hydrocarbon group which may be interupted by ester groups. $R_3$ is a $C_1$–$C_4$ saturated alkyl or hydroxyalkyl group, $R_4$ is selected from $R_2$ and $R_3$, and A is an anion;

Rapidly biodegradable compounds of formula (i) where $R_2$, and possibly $R_4$, are interupted by ester groups, are disclosed in EPA 239,910.

(ii) diamido quaternary ammonium salts having the formula:

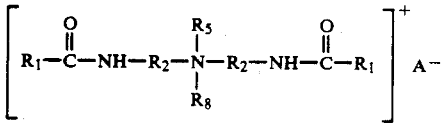

wherein $R_1$ is an acyclic aliphatic $C_{15}$–$C_{22}$ hydrocarbon group, $R_2$ is a divalent alkylene group having 1 to 3 carbon atoms, $R_5$ and $R_8$ are $C_1$–$C_4$ saturated alkyl or hydroxyalkyl groups, and $A^-$ is an anion;

(iii) diamido alkoxylated quaternary ammonium salts having the formula:

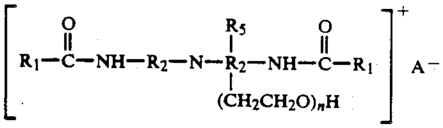

wherein n is equal to from about 1 to about 5, and $R_1$, $R_2$, $R_5$ and $A^-$ are as defined above.

(iv) quaternary imidazolinium compounds having the formula:

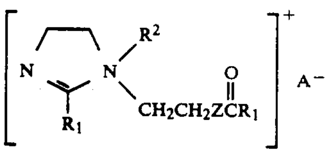

wherein $R_1 = C_{15}$–$C_{17}$ saturated alkyl, $R_2 = C_1$–$C_4$ saturated alkyl, Z=NH or O, and $A^-$ is an anion.

Examples of Component (i) are the well-known dialkyldimethylammoniums salts such as ditallowdimethylammonium chloride, ditallowdimethylammonium methylsulfate, di(hydrogenated tallow) dimethylammonium chloride, dibehenyldimethylammonium chloride.

Examples of Component (ii) and (iii) are methylbis(-tallowamidoethyl) (2-hydroxyethyl) ammonium methylsulfate and methylbis(hydrogenated tallowamidoethyl) (2-hydroxyethyl) ammonium methylsulfate, wherein $R_1$ is an acyclic aliphatic $C_{15}$–$C_{17}$ hydrocarbon group, $R_2$ is an ethylene group, $R_5$ is a methyl group, $R_8$ is a hydroxyalkyl group and A is a methylsulfate anion; these materials are available from Sherex Chemical Company under the trade names Varisoft ® 222 and Varisoft ® 110, respectively.

Examples of component (iv) are 1-methyl-1-tallowamino-ethyl-2-tallowimidazolinium methylsulfate and 1-methyl-1-(hydrogenated tallowamidoethyl)-methylsulfate.

The ratio of quaternary ammonium salt to cyclic-amine should not exceed 10:1, and preferably does not exceed 2:1.

The aqueous dispersion of quaternary softening agent is prepared in a conventional way, typically by injecting the quaternary material in a molten form in a batch containing water, with continuous agitation.

Once this dispersion is prepared, the concentrated composition resulting from steps (a) to (d) will be added to it;

In case of a continuous process, said concentrated composition will, immediately after step (d) be added to the aqueous dispersion of quaternary ammonium compound.

In an alternative and convenient way, the concentrated composition obtained after step (d) will first be cooled to a temperature of from 15° to 25° C., (room temperature) and then some time will be allowed for e.g. storage, shipment of the concentrated composition, before it is added to the aqueous dispersion of quaternary softening agent.

In any case, the viscosity of the finished product will be in a range of 20 to 500 cp, preferably 50 to 150 cp.

Optional co-softening agents

It has proven desirable, in state-of-the-art executions, to incorporate in softening compositions certain co-softening agents, in addition to the main softening active.

However, it has been found that performance negatives appear when one wants to incorporate such materials to a mixture of softening actives such as mixtures of quaternary ammonium conventional softening agents and cyclic amine softening agents of formula I.

The particular process of the present invention, now allows the incorporation of said co-softening agents, without any detrimental effect on performance.

Said co-softening agents are pre-mixed with the quaternary ammonium softening agent and the premix injected in water; Then, the concentrated composition obtained by steps (a) to (d), is added on top.

The co-softening agents for use herein can be selected from fatty acid esters of polyhydric alcohols having up to 8 carbon atoms such as described in DE-A-26 31 114. Examples of the like esters include sorbitan esters and glycerol esters such as sorbitan monostearate, sorbitan monooleate, glycerol mono-di- and tri-fatty acid esters wherein the acid is selected from stearic, oleic, lauric, capric, caprylic, caproic, valeric, butyric, propionic and acetic acid; an individual glycerol can be esterified by identical fatty acid groups or by mixed esters e.g. glycerol monostearatedioleate. Polyethyleneglycol esters monostearate, wherein the polyethyleneglycol moiety has a molecular weight in the range from 200 to 400 are also included in that class. Fatty acid esters of monohydric alcohols having at least 4 carbon atoms such as isobutyl stearate and ethyl hexyl stearate can also be useful.

Additional co-softening agents which can be used are: glycerol, diglycerol, ethylene glycol, propylene glycol, diethylene glycol, dipropylene glycol, dihexylene glycol, polyethylene glycol (MW 200–100,000), polypropylene glycol (MW 200–100,000), polyvinylalcohol, polyoxyethylenepolyoxypropylene copolymers, polypropylene glycol (MW 900), glucoe methylether, butyldiglycolether, diethyleneglycolmonobutylether, propyleneglycolmonoethyl or ethyl ether, ethylene carbonate, propylene carbonate.

Useful also are alkylpolyglucosides of the general formula $R^2O(CnH_{2n}O)_t$ (glucosyl)$_x$ wherein $R^2$ is alkyl, alkylphenyl, hydroxyalkyl, hydroxyalkylphenyl and mixture thereof wherein the alkyl chain has from 8 to 18 carbon atoms, t is from 0 to 2 and x from 2 to 7, can also be used in the composition. These glucosides exhibit desirable solvent properties and in addition can confer fiber benefits such as softness.

Lanolins and derivatives and paraffins having from 16 to 30 carbon atoms contitute another example of non-ionic agents which can be used if desired. Low melting oils from animal, vegetable or mineral origin are representative of this class of materials. Carnation oil ®, Jojoba oil ® and Sunflower oil are specific examples which are found to work.

Another important class of co-softening agents is represented by materials of the general formula:

$R_1COOR_2$ wherein $R_1$ is a straight or branched chain alkyl or alkenyl group having from 8 to 23 carbon atoms and $R_2$ is hydrogen or an alkyl or hydroxyalkyl group having 1–4 carbon atoms.

Highly preferred materials of this class are the $C_{10}$ to $C_{20}$ saturated fatty acids, especially lauric acid, myristic acid, palmitic acid and stearic acid.

Clay materials such as the low ion-exchange-capacity ones described in EPA 150,531 can also be used.

The co-softening agents above can be used in combination with cation-active amines, namely primary, secondary and tertiary amines having, at least, one straight-chain organic group of from 12 to 22 carbon atoms. Preferred amines of this class are ethoxyamines, such as monotallow dipolyethoxyamine, having a total of 2 to 30 ethoxygroups per molecule. Suitable are also diamines such as tallow-N,N',N'-tris (2-hydroxyethyol)-1,3-propylenediamine, or $C_{16-18}$-alkyl-N-bis(2-hydroxyethyl) amines, examples of above amines are these sold under the trade name GENAMIN C, S, D, and T, by Hoechst.

The co-softening agents above are used at ratios of from 5:1 of 20:1 of quaternary softening agent to co-softening agent.

In the instance for fatty acids are used, a preferred ratio is from 8:1 to 10:1.

Other optional ingredients

Optional silicone Component

In the course of the present process is advantageously added an aqueous emulsion of a predominantly linear polydialkyl or alkyl, aryl siloxane in which the alkyl groups can have from one to five carbon atoms and may be wholly or partially fluorinated. Suitable silicones are polydimethyl siloxanes having a viscosity at 25° C. in the range from 100 to 100,000 centistokes, preferably in the range from 1000 to 12,000 centistokes.

Silicone components suitable for use herein are more fully described in British Patent No. 1.549.180.

Organic solvent

The softening compositions herein can be formulated without the use of any organic solvent. However, the presence of organic solvents (for example, low molecular weight, water miscible aliphatic alcohols,) does not harm the storage stability, the viscosity, or the softening performance of the compositions of this invention. Typically, the cyclic amine will be obtained from a supplier of bulk chemicals in solid form of as a solution in an organic solvent, e.g. isopropanol. There is no need, whatsoever, to remove such as solvent in making the compositions of this invention. Indeed, additional solvent may be added, if this is deemed desirable.

Further other optional ingredients for use herein include emulsifiers, preservatives, germicides, dyes, bactericides, stabilizers, brighteners, opacifiers, photoactivators, copolymeric carboxylates having sequestering properties, soil release agents, bleaches, bleach activators, and anti-yellowing agents. Suitable polymeric soil-release agents are disclosed in E.P.A. 220,156.

These additives are normally incorporated at their conventional low levels e.g. from about 0.001% to 5%, in the dilution step of the concentrates herein.

Textile treatment compositions obtained by preferred process

The present invention also encompasses textile treatment compositions which contain a mixture of softening ingredients of formula I and quaternary softening ingredients, and have been prepared according to the process described in A and B hereinabove.

Such compositions are substantially free of electrolyte, have a viscosity of from 20 to 500 cp and are characterised by the fact that the two softening actives are present as two distinct dispersions, as a direct consequence of the specific making process herein.

Experimental Part

Product 1

A concentrated composition is prepared according to steps (a) to (d) of the present process, having the following ingredients:

| | |
|---|---|
| Ditallowimidazoline | 24.2% |
| Hydrochloric acid | 1.57% |
| Polyethylene glycol MW 4000 | 1.50% |
| Perfume | 1.25% |
| Water | up to 100 |

Details of the process are as follows:

About 10% of the total level of hydrochloric acid needed are added to deinonized water at 65° C., as a 16% aqueous solution.

To this solution, the ditallowimidazoline is injected in molten form at 85° C. to 90° C., under high speed mixing (tip speed 6.1 m/s). The injection lasts about 10 minutes: the remaining quantity of hydrochloric acid as a 16% aqueous solution is gradually injected, simultaneously with the dittalowimidazoline. After total injection of the hydrochloric acid and the softening agent, a 50% aqueous solution of polyethylene glycol (MW 4000) is injected, then the perfume composition added, and the composition cooled to room temperature.

Product 2

The final softening composition is prepared, having the following formula:

| | |
|---|---|
| Concentrated composition obtained in 1) | 20% |
| Ditallowdimethylammoniumchloride (DTDMAC) | 2.6% |
| Polydimethylsiloxane (PDMS) | 0.15% |
| Water & minors | up to 100 |

To make this product, molten DTDMAC at about 55° C. is first injected into deionized water at about 45° C., under agitation with a maximum tip speed of 2.3 m/s.

The concentrated composition obtained in (1) is then poured on top, the PDMS added, and the product cooled to room temperature.

Product 3

For comparative purpose, a softening composition is prepared having the same ingredients and levels product 2 above, but which is made by state-of-the-art process, i.e. injection of a DTDMAC/ditallowimidazoline premix in deionized water under agitation at maximum tip speed of 3.5 m/s, followed by the addition of hydrochloric acid, PDMS, polyethylene glycol and minor ingredients.

Viscosity measures gave the following results:

| PRODUCT | STORAGE TIME | TEMPERATURES (°C.) 4° | 10° | 20° | 35° | 50° |
|---|---|---|---|---|---|---|
| 1 | fresh | | | 100 cps | | |
| | 1 week | | 166 cps | 117 cps | 225 cps | |
| | 4 weeks | | 455 cps | 128 cps | 267 cps | |
| 2 | fresh | | | 47 cps | | |
| | 1 week | 65 cps | 53 cps | 55 cps | 43 cps | 55 cps |
| | 4 weeks | 122 cps | 53 cps | 50 cps | 42 cps | 56 cps |
| 3 | fresh | | | 47 cps | | |
| | 1 week | 51 cps | 50 cps | 79 cps | 140 cps | 291 cps |
| | 4 weeks | 70 cps | 70 cps | 92 cps | 192 cps | 416 cps |

It can be seen from the above data, that the viscosity of product 2 is more uniform with temperature and time, compared to state-of-the-art product 3.

The above products 1 and 2 were also found to be perfectly phase stable after four weeks storage, at all temperatures indicated hereinabove.

Identification of the process from the finished product

This applies to the preferred execution of the present process i.e. preparation of a concentrated composition containing the cyclic amine softener, followed by the addition of said concentrate to a dispersion of quaternary ammonium compound;

It has been observed that, after ultra centrifugation of a product containing a mixture of ditallow imidazoline and ditallowdimethylammonium chloride, prepared according to the process of the invention, the two softener actives are present as two separate layers. This shows that the softening compositions herein contain two distinct dispersions of softener actives. If the softening composition is prepared according to a state-of-the-art method, only one layer is present i.e. the two softener actives are dispersed together in the same phase.

Another method has been used to show that the finished product contains two separate dispersions of softener actives: Differential Scanning Calorimetry (DSC).

DSC is a technique used to study the thermal behaviour of materials undergoing phase transitions.

The DSC technique allows to determine the amount of energy (heat of transition) associated with a phase transition of the material under study, accross a temperature range.

This measures are done by comparison with a reference, and what is actually measured is a difference in energy needed to heat up the reference and the sample to a given temperature.

A DSC test was conducted on both products 2 (invention) and 3 (state of the art) hereinabove.

The apparatus used was a Perkin Elmer ® Differential Scanning Calorimeter; 40 to 50 mg of, in turn, product 2, and product 3, were put into a 50 microliter cell, whereas an identical cell, empty, constituted the reference.

Temperature was gradually increased from a value of 20° C. or 25° C., at a speed of 5° C. per minute.

Figure 2:
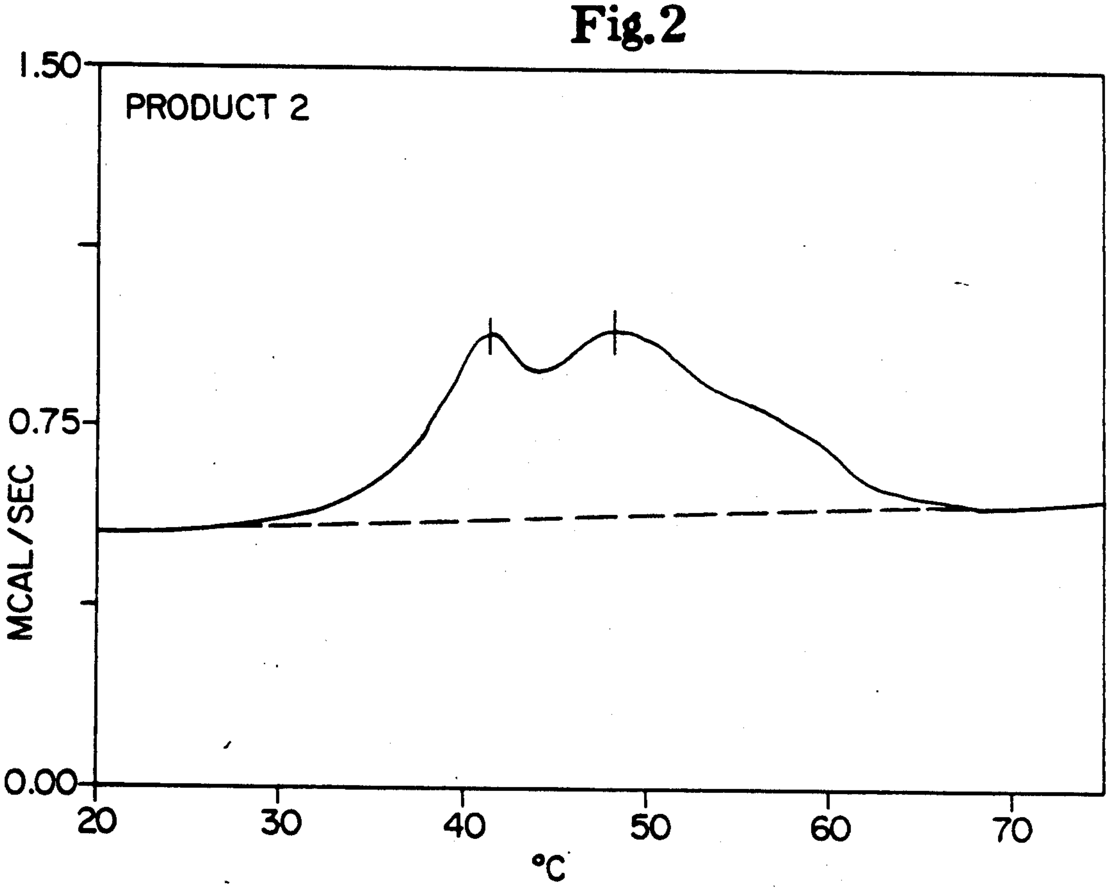

The obtained scans are shown on FIGS. 1 and 2, herewith attached.

For product 3: a broad peak from about 30° C. to 60° C. was observed. (FIG. 1)

For product 2: two peaks were clearly observed: (FIG. 2)

one with a maximum at 41,99° C., representing the phase transition of the dispersed ditallowdimethylammonium chloride particles, one with a maximum at 48.23° C., representing the phase transition of the dispersed ditallowimidazoline particles.

The existence of two distinct dispersions is thus proven.

We claim:

1. A process for the preparation of a pourable, pumpable, stable concentrated composition containing from about 10% to about 40% by weight of a softening agent of the formula:

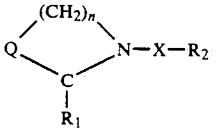

(I)

wherein n is 2 or 3, $R_1$ and $R_2$ are, independently, a $C_8$–$C_{30}$ alkyl or alkenyl group, Q is CH or N, X is 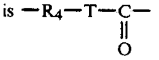

wherein T is O or $NR_5$, $R_5$ being H or $C_1$–$C_4$ alkyl, and $R_4$ is a divalent $C_1$–$C_3$ alkylene group or $(C_2H_4O)_m$, wherein m is a number of from about 1 to about 8; or X is $R_4$, that said process comprising the steps of:

(a) adding a Bronstedt acid or an aqueous solution thereof to water at a temperature of from about 50° C. to about 100° C., the quantity of said Bronstedt acid not exceeding about 90% of the total quantity Bronstedt acid to be used in steps (a) and (c), said total quantity of Bronstedt acid being from about 1% to about 50% of the softening agent of formula I;

(b) Injecting into the solution of step (a), a melt at a temperature higher than about 75° C. containing the softening agent of formula I;

(c) Concurrently with step (b), gradually injecting into the solution of step (a), the remaining quantity of Bronstedt acid;

(d) Adding a compound selected from the group of polyols, mono- and poly-hydroxy acids and salts thereof, ethoxylated amines and mixtures thereof, and amino-acids in an amount of from about 3% to about 30% of the softening agent of formula I; and (e) Adding a water-insoluble perfume composition, the quantity of said perfume composition being from about 2% to about 15% of the softening agent of formula I;

said composition having a viscosity of from about 20 to about 500 cps when it is substantially free of added water-soluble ionizable salts.

2. The process of claim 1 wherein in formula I herein, n=2, $R_1$ and $R_2$ are, independently, $C_{12}$-$C_{20}$ alkyl, Q is N, and X is —$C_2H_4$—NH—CO—.

3. The process of claim 1 wherein in formula I herein n=2, $R_1$ and $R_2$ are, independently, $C_{12-20}$ alkyl, Q is N and X is $C_2H_4$—O—CO—.

4. The process of claim 1 wherein the Bronstedt acid is selected from the group consisting of the inorganic mineral acids and the organic acids of the formula R—COOH or R—$CH_2$—$SO_3H$, wherein R is hydrogen or $C_1$ to $C_4$ alkyl; and mixtures thereof and the viscosity is less than about 150 cps.

5. The process of claim 4 wherein the Bronstedt acid is selected from the group of formic acid, phosphoric acid, methylsulfonic acid, hydrochloric acid.

6. The process of claim 4 wherein the total amount of Bronstedt acid is from about 2% to about 30%, by weight of the softening agent of formula I.

7. The process of claim 6 wherein the amount of Bronstedt acid used in step (a) is from about 10% to about 70% of the total quantity of Bronstedt acid to be used in steps (a) and (c).

8. The process of claim 7 wherein the amount of added compound in step (d) is from about 5% to about 20% of the softening agent of formula I, and the amount of perfume composition added in step (e) is from about 3% to about 8% of the softening agent of formula I.

9. The process of claim 8 wherein the compound added in step (d) is selected from the group consisting of polyethylene glycol, polypropylene glycol, glucose, gluconic acid/sodium gluconate, citric acid/sodium citrate, monoethanolamine, diethanolamine, triethanolamine, lysine, and mixtures thereof.

10. The process of claim 9 wherein the compound added in step (d) is polyethylene glycol with a molecular weight of from 2000 to 10000.

11. The process of claim 1 wherein the hot melt in step (b) consists only of the cyclic amine of formula I.

12. The process of claim 1 wherein the hot melt in step (b) contains an additional softening agent selected from quaternary ammonium and imidazolinium compounds.

13. A process for preparing a fabric-softening composition in which a concentrated composition containing from about 10% to about 40% of the softening agent of formula:

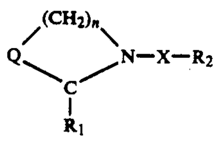

(I)

wherein n is 2 or 3, $R_1$ and $R_2$ are, independently, a $C_8$-$C_{30}$ alkyl or alkenyl group, Q is CH or N, X is 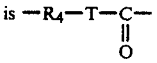

wherein T is O or $NR_5$, $R_5$ being H or $C_1$-$C_4$ alkyl, and $R_4$ is a divalent $C_1$-$C_3$ alkylene group of $(C_2H_4O)_m$, wherein m is a number of from about 1 to about 8; or X is $R_4$, in the form of a finely divided dispersion is prepared, and said dispersion is then added to an aqueous dispersion of a softening agent selected from the group of quaternary ammonium and imidazolinium compounds.

14. The process of claim 13, wherein said softening agent is a quaternary ammonium compound.

15. The process of claim 14, wherein the quaternary ammonium softening agent is pre-mixed with a co-softening agent selected from the group consisting of: a glycerol ester, a fatty alcohol, an alkoxylated fatty alcohol; a fatty acid, and mixtures thereof, before being dispersed in water.

16. The process of claim 15, wherein the weight ratio of quaternary ammonium softening agent to co-softening agent is from 5:1 to 20:1.

17. The process of claim 15, wherein the co-softening agent is a $C_{12}$-$C_{24}$ fatty acid.

18. The process of claim 17 wherein the weight ratio of quaternary ammonium to fatty acid compound is from 8:1 to 10:1.

19. The process of claim 14 wherein the quaternary ammonium compound is ditallowdimethylammonium chloride.

20. A process for preparing a fabric softening composition, wherein a concentrated composition according to claim 1 is prepared, and then diluted in water.

21. A concentrated composition prepared according to the process of claim 1.

22. A textile treatment composition prepared according to the process of claim 13, containing a mixture of softening agent of formula:

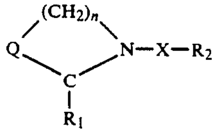

(I)

wherein n is 2 or 3, $R_1$ and $R_2$ are, independently, a $C_8$-$C_{30}$ alkyl or alkenyl group, Q is CH or N, X is 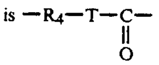

wherein T is O or $NR_5$, $R_5$ being H or $C_1$-$C_4$ alkyl, and $R_4$ is a divalent $C_1$-$C_3$ alkylene group or $(C_2H_4O)_m$, wherein m is a number of from about 1 to about 8; or X is $R_4$, and of quaternary softening agent, said composition having a viscosity of from 20 to 500 cp, said softening agent of formula I and said quaternary softening agent being present as two distinct dispersions.

23. The composition of claim 22 wherein the softening agent of formula I is such that n=2, $R_1$ and $R_2$ are $C_{12}$-$C_{20}$ alkyl, Q is N, and X is —$C_2H_4$—NH—CO— or —$C_2H_4$—O—CO—, and the quaternary softening agent is a di-long alkyl chain quaternary ammonium softening agent.

* * * * *